No. 747,713. PATENTED DEC. 22, 1903.
H. A. HOPKINS.
APPARATUS FOR DISPENSING HOT BEVERAGES.
APPLICATION FILED OCT. 15, 1903.
NO MODEL.
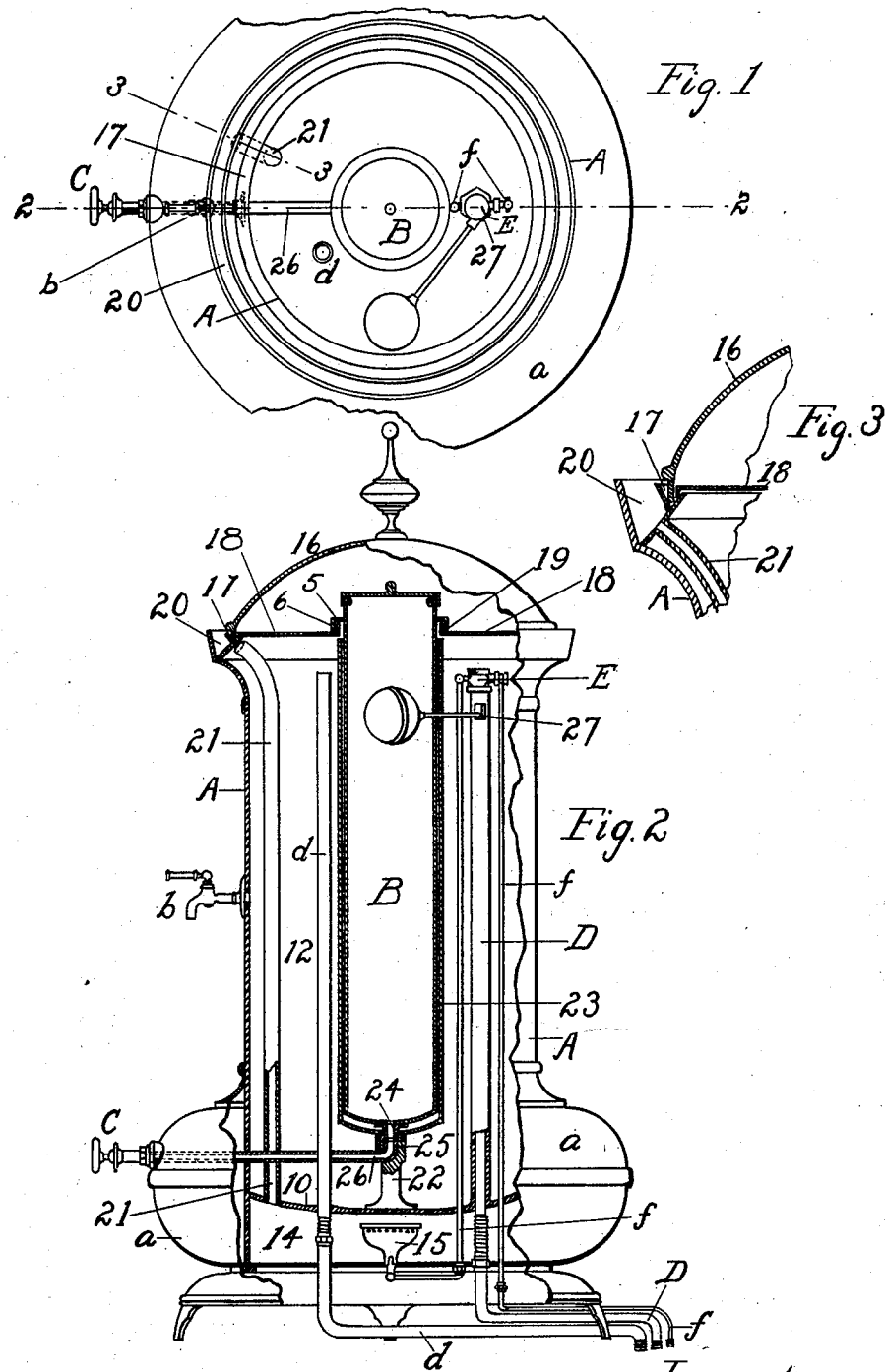
Witnesses
F. B. Spaulding
J. E. Maloney
Inventor.
Heber A. Hopkins
by F. L. Teschemacher
Atty No. 747,713. Patented December 22, 1903.

UNITED STATES PATENT OFFICE.

HEBER A. HOPKINS, OF WEST ROXBURY, MASSACHUSETTS, ASSIGNOR TO AMERICAN SODA FOUNTAIN COMPANY, OF JERSEY CITY, NEW JERSEY, A CORPORATION OF NEW JERSEY.

APPARATUS FOR DISPENSING HOT BEVERAGES.

SPECIFICATION forming part of Letters Patent No. 747,713, dated December 22, 1903.

Application filed October 15, 1903. Serial No. 177,206. (No model.)

*To all whom it may concern:*

Be it known that I, HEBER A. HOPKINS, a citizen of the United States, residing at West Roxbury, in the county of Suffolk and State of Massachusetts, have invented certain new and useful Improvements in Apparatus for Dispensing Hot Beverages, of which the following is a specification.

My invention relates to apparatus for dispensing hot beverages, in which the beverage-containing receptacle is placed in a hot-water bath or tank, and has for its object the automatic supplying of water to the water bath or tank and also the automatic control of the temperature of the water therein in order that the beverage may always be kept at the proper temperature for use.

With these ends in view my invention consists in certain novel features and combination of parts, as will be hereinafter described and claimed.

In the accompanying drawings, Figure 1 is a plan view of my improved apparatus for dispensing hot beverages with the covers removed. Fig. 2 is a sectional elevation of the same on the line 2 2 of Fig. 1. Fig. 3 is an enlarged sectional detail on the line 3 3 of Fig. 1.

In the said drawings, A represents the casing of the apparatus, which may be composed of sheet metal or other suitable material and is preferably made of cylindrical shape, with a projecting rounded base $a$, as shown in Fig. 2. Within this casing near its bottom is a transverse partition 10, that portion of the casing above said partition forming a tank or receptacle 12 for containing water, beneath which is a combustion-chamber 14, in which is placed a gas-burner 15, whereby the water in the tank 12 is heated to the desired temperature.

$b$ is a faucet through which pure hot water may be drawn from the tank 12 for making beef-tea or other beverages.

The casing A is provided with a removable top or cover 16, having a vertical flange on its under side around the edge which projects down into an annular V-shaped groove 17, formed around the upper edge of the casing A, said groove being adapted to contain water from the condensed steam, an ordinary water-joint being thus formed, making the tank steam-tight. Beneath the cover 16 is an inner cover 18, having a central aperture provided with a vertical flange 19. Outside the groove 17 is an annular groove 20, into which extends the upper end of a ventilating pipe or flue 21, leading from the combustion-chamber 14, which serves to carry off the fumes produced by the combustion of gas in the chamber 14, and thus prevent the contamination of the water in the tank.

Within the tank and supported on a stand 22, rising from the partition 10, is secured a cylindrical casing 23, within which loosely fits a removable can B for containing chocolate, coffee, or other beverage, which is maintained at the proper temperature for use by the heat of the water in the tank 12, which surrounds the casing 23, in which the can is placed. This can is provided near its top with a horizontal flange 5, having a depending lip 6, which fits loosely over the vertical flange 19 of the cover 18. The bottom of the can B is provided with a threaded nipple 24, which is screwed into a passage 25 in the stand 22, communicating with a horizontal draft-pipe 26, which extends out through the casing A, where it is provided with a faucet C, through which the contents of the can B may be drawn off as required.

The purpose of the casing 23 is to prevent the water in the tank 12 from rising within the can B when the latter is being withdrawn and then flowing out, allowing the remaining contents of the can to become mixed with the pure water in the tank 12.

D is a pipe through which water from a suitable source is supplied to the water bath or tank 12, and near its upper or inlet end this pipe is provided with a float-valve 27, by which the supply of water is automatically controlled and constantly maintained at the desired level within said tank.

Steam-pressure within the tank 12 is prevented by means of a standing waste-pipe $d$, which also serves to take care of any overflow in the event of the float-valve getting out of order.

Gas is supplied to the burner 15 through a pipe $f$, which enters the casing near its bottom and extends up within the tank 12 to the top of the water-supply pipe D, then over the same, and down to the burner 15. This gas-pipe is provided at a suitable portion of its length with an automatic regulator E of any suitable or well-known construction, by means of which the heat of the water in the tank is caused to control the supply of gas passing to the burner 15, whereby the water in the tank and the beverage in the can are always automatically maintained at the desired temperature for use.

If desired, instead of a single beverage-can two or more may be arranged within the casing, each provided with a separate draft-pipe and faucet.

The above-described apparatus is exceedingly simple in its construction and combines many advantages not hitherto found in any apparatus of this description with which I am acquainted.

What I claim as my invention, and desire to secure by Letters Patent, is—

1. In an apparatus for dispensing hot beverages, the combination of a casing having a removable cover and water-joint therefor, said casing forming a water tank or bath and being provided with a faucet, a beverage-can arranged within said tank or bath and connected with a draft-pipe extending through the casing and provided with a faucet or draft-cock, a supply-pipe for the water-tank having a float-valve within said tank, a combustion-chamber beneath the water-tank, a gas-burner in said combustion-chamber and an automatic heat-regulating device for said burner, adapted to be controlled by the temperature of the water in the tank.

2. In an apparatus for dispensing hot beverages, the combination of a casing having a removable cover and water-joint therefor, said casing forming a water tank or bath and being provided with a faucet, a waste or outlet pipe for said tank, a beverage-can arranged within said tank or bath and connected with a draft-pipe extending through the casing and provided with a faucet or draft-cock, a supply-pipe for the water-tank having a float-valve within said tank, a combustion-chamber beneath the water-tank, a gas-burner in said combustion-chamber and an automatic heat-regulating device for said burner adapted to be controlled by the temperature of the water in the tank.

3. In an apparatus for dispensing hot beverages, the combination of a casing having a removable cover and water-joint therefor, said casing forming a water tank or bath and being provided with a faucet, a beverage-can arranged within said tank or bath and connected with a draft-pipe extending through the casing and provided with a faucet or draft-cock, a supply-pipe for the water-tank having a float-valve within said tank, a combustion-chamber beneath the water-tank, a gas-burner in said combustion-chamber, an automatic heat-regulating device for said burner, adapted to be controlled by the temperature of the water in the tank, and a ventilating pipe or flue for said combustion-chamber, whereby the fumes from the gas-burner are conducted outside the casing.

4. An apparatus for dispensing hot beverages comprising a casing having a removable cover and water-joint therefor, said casing forming a water tank or bath and being provided with a faucet and a waste or outlet pipe, a beverage-can arranged within said tank or bath and connected with a draft-pipe extending through the casing and provided with a faucet or draft-cock, a supply-pipe for the water-tank having a float-valve within said tank, a combustion-chamber beneath the water-tank, a gas-burner in said combustion-chamber, an automatic heat-regulating device for said burner adapted to be controlled by the temperature of the water in the tank, and a ventilating pipe or flue for said combustion-chamber, whereby the fumes from the gas-burner are conducted outside the casing.

5. An apparatus for dispensing hot beverages comprising a casing having a removable cover and water-joint therefor, said casing forming a water tank or bath and being provided with a faucet and a waste or outlet pipe, a fixed cylindrical casing placed within the outer casing and connected with a draft-pipe extending through the outer casing and provided outside the latter with a faucet or draft-cock, a removable beverage-can fitting loosely within said fixed cylindrical casing and provided at its bottom with a threaded nipple engaging a threaded passage at the bottom of the fixed cylindrical casing in communication with the draft-pipe, a supply-pipe for the water-tank having a float-valve within said tank, a combustion-chamber beneath the water-tank, a gas-burner in said combustion-chamber, an automatic heat-regulating device for said burner adapted to be controlled by the temperature of the water in the tank, and a ventilating pipe or flue for said combustion-chamber, whereby the fumes from the gas-burner are conducted outside the casing.

Witness my hand this 14th day of October, A. D. 1903.

HEBER A. HOPKINS.

In presence of—
P. E. TESCHEMACHER,
JOHN MACKSEY.